(12) United States Patent
Knaggs et al.

(10) Patent No.: US 8,322,871 B1
(45) Date of Patent: Dec. 4, 2012

(54) OPTICAL FIBER TRACING SYSTEM

(75) Inventors: David H. Knaggs, Spokane, WA (US); Chris A. Dinwoodie, Colbert, WA (US); Michael VanMansum, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 422 days.

(21) Appl. No.: 12/787,883

(22) Filed: May 26, 2010

(51) Int. Cl.
*F21V 9/16* (2006.01)
(52) U.S. Cl. ............. 362/84; 362/34; 362/391; 362/551
(58) Field of Classification Search ............... 362/34, 362/84, 391, 551; 385/102, 901; 439/102, 439/106, 127, 901
See application file for complete search history.

(56) References Cited

U.S. PATENT DOCUMENTS 6,347,172 B1 *  2/2002  Keller et al. .................. 385/102
7,401,961 B2 *  7/2008  Longatti et al. ............... 362/551

* cited by examiner

*Primary Examiner* — Meghan Dunwiddie
(74) *Attorney, Agent, or Firm* — Michael S. Neustel

(57) ABSTRACT

An optical fiber tracing system for efficiently tracing one or more optical fibers within a fiber-optic communication system. The optical fiber tracing system generally includes an optical fiber and a luminescent member positioned adjacent to the optical fiber. The luminescent member illuminates along the length thereof for allowing a selective visual tracing of an individual optical fiber or group of optical fibers. The luminescent member is preferably comprised of an electroluminescent wire (EL wire) that extends along the length of the optical fiber.

20 Claims, 7 Drawing Sheets

OPTICAL FIBER TRACING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a fiber-optic communication systems and more specifically it relates to an optical fiber tracing system for efficiently tracing one or more optical fibers within a fiber-optic communication system.

2. Description of the Related Art

Any discussion of the related art throughout the specification should in no way be considered as an admission that such related art is widely known or forms part of common general knowledge in the field.

Optical fibers are used in fiber-optic communication systems to transmit information over significant distances using pulses of light that pass through the optical fibers. Information transferred over a conventional fiber-optic communications system includes but is not limited to telephone signals, Internet, electronic mail, television signals, images and the like. In a conventional fiber-optic communication system, each of the distal ends of an optical fiber are connected to a port within a corresponding patch panel where the signal may be converted to an electrical signal or directed to another optical fiber. A typical patch panel will have up to 144 different ports available for connection so when connecting two patch panels together there can be up to 20,736 different possible pairs which are connected. With this significant number of ports and pairing combinations, it can take a long time to determine which two ports in different patch panels are connected by a single optical fiber.

While fiber-optic communication systems have significant advantages over wire communication systems, it can be difficult to locate a specific optical fiber or group of optical fibers. Conventional tracing technology uses a tracer light that illuminates one end of the optical fiber in a first patch panel and then the light can be detected at the opposite end in a second patch panel. Hence, conventional tracing technology allows for location of only the termination points of the optical fiber.

One problem with the conventional tracing technology is that it does not provide a means for tracing the entire path of the optical fiber. Another problem with the conventional tracing technology is that it does not provide a means for locating the optical fiber in a fiber duct. A further problem with conventional tracing technology is that it can be difficult to identify the two ports interconnected by an optical fiber. Another problem with the conventional tracing technology is that it can be difficult to use when the patch panels are closed.

Because of the inherent problems with the related art, there is a need for a new and improved optical fiber tracing system for efficiently tracing one or more optical fibers within a fiber-optic communication system.

BRIEF SUMMARY OF THE INVENTION

A system for efficiently tracing one or more optical fibers within a fiber-optic communication system. The invention generally relates to a fiber-optic communication system which includes an optical fiber and a luminescent member positioned adjacent to the optical fiber. The luminescent member illuminates along the length thereof for allowing a selective visual tracing of an individual optical fiber or group of optical fibers. The luminescent member is preferably comprised of an electroluminescent wire (EL wire) that extends along the length of the optical fiber.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
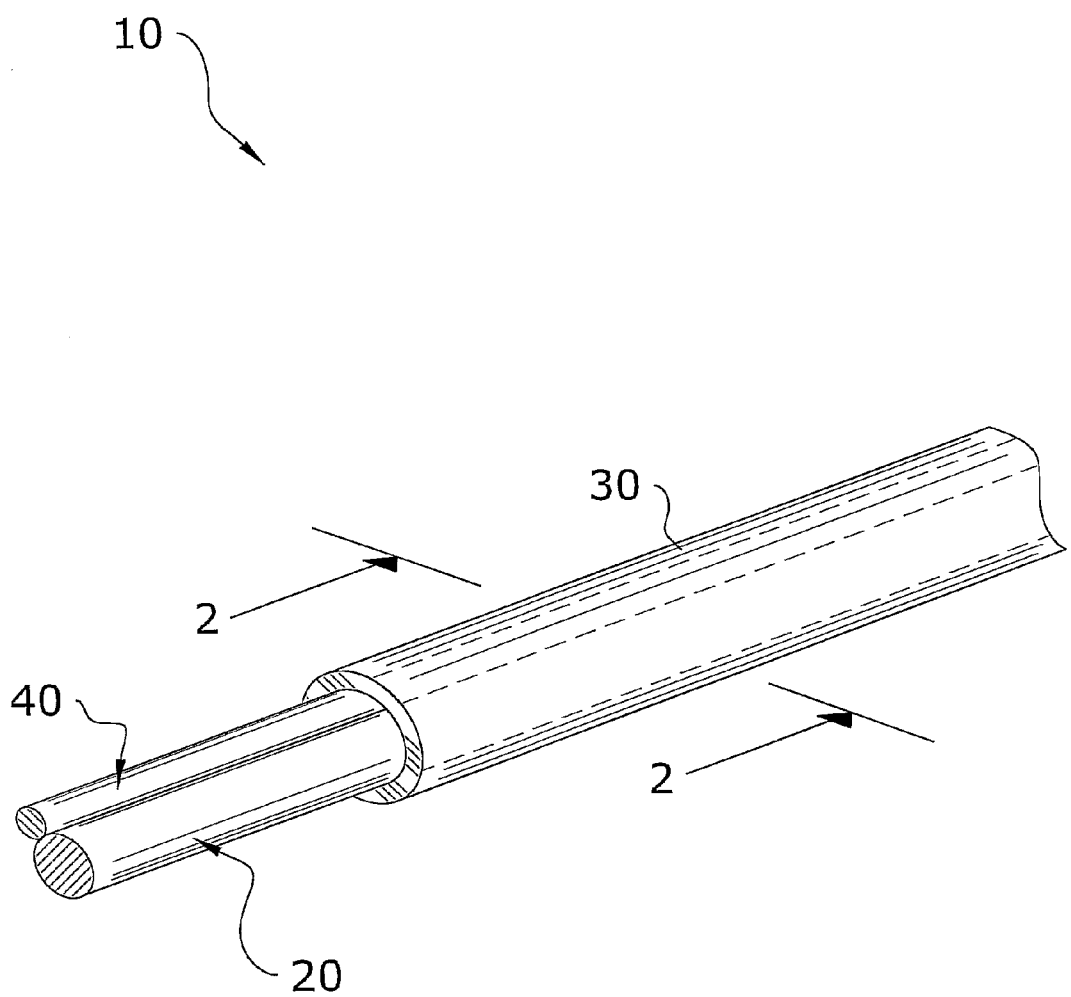
FIG. 1 is an upper perspective partial cutaway view of the present invention.

A. Overview.

Turning now descriptively to the drawings, in which similar reference characters denote similar elements throughout the several views, FIGS. 1 through 7 illustrate an optical fiber tracing system 10, which comprises an optical fiber 20 and a luminescent member 40 positioned adjacent to the optical fiber 20. The luminescent member 40 illuminates along the length thereof for allowing a selective visual tracing of an individual optical fiber 20 or group of optical fibers 20. The luminescent member 40 is preferably comprised of an electroluminescent wire (EL wire) that extends along the length of the optical fiber 20.

B. Optical Fiber.

The optical fiber 20 is comprised of a length of material having a first end and a second end for fiber-optic communications. Conventional optical fiber 20 is comprised of a core that allows light to freely pass through, a cladding surrounding the core to reflect the light back into the core, and a protective cover to protect the cladding and core from damage. Conventional optical fiber 20 and other types of optical fiber 20 capable of transferring light are suitable for usage within the present invention.

The optical fiber 20 may be comprised of various thicknesses such as but not limited to 900 or 250 micron. The optical fiber 20 may also be encased with aramid fibers 22 to provide a yellow color when the luminescent member 40 is not illuminated.

C. Luminescent Member.

The luminescent member 40 is positioned adjacent to and along the optical fiber 20 for allowing a selective visual tracing of an individual optical fiber 20 or group of optical fibers 20. Preferably, at least a substantial and continuous portion of the length of the luminescent member 40 illuminates producing a 360 degree continuous visible light. The luminescent member 40 preferably extends the length of the optical fiber 20 from the first end to the second end of the optical fiber 20. The luminescent member 40 preferably has a thickness less than or equal to 1 mm to prevent damaging the optical fiber 20 with the weight of the luminescent member 40.

Figure 2:
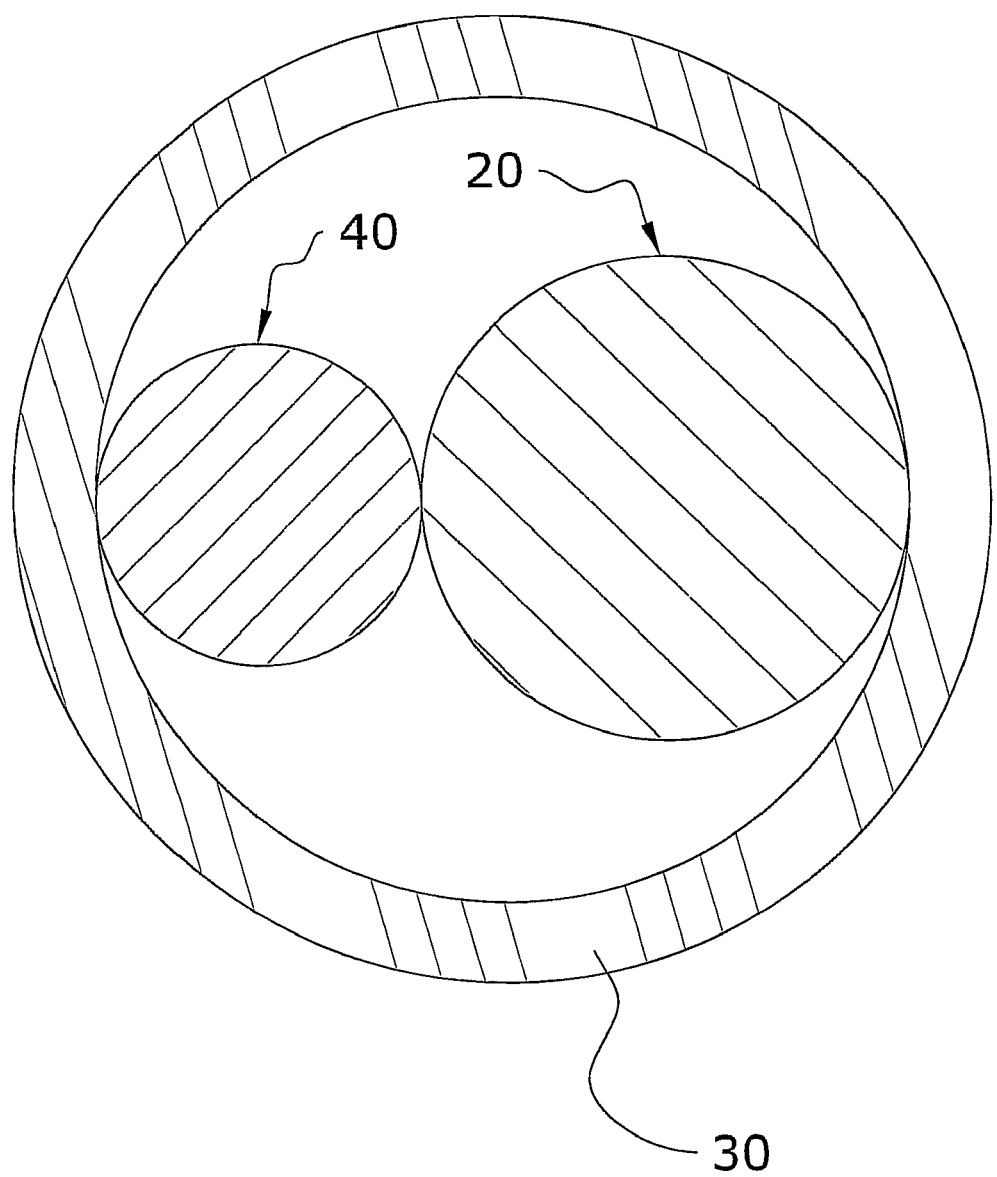
FIG. 2 is a cross sectional view taken along line 2-2 of FIG. 1 illustrating the optical fiber and luminescent member surrounded by a translucent cover.
Figure 3:
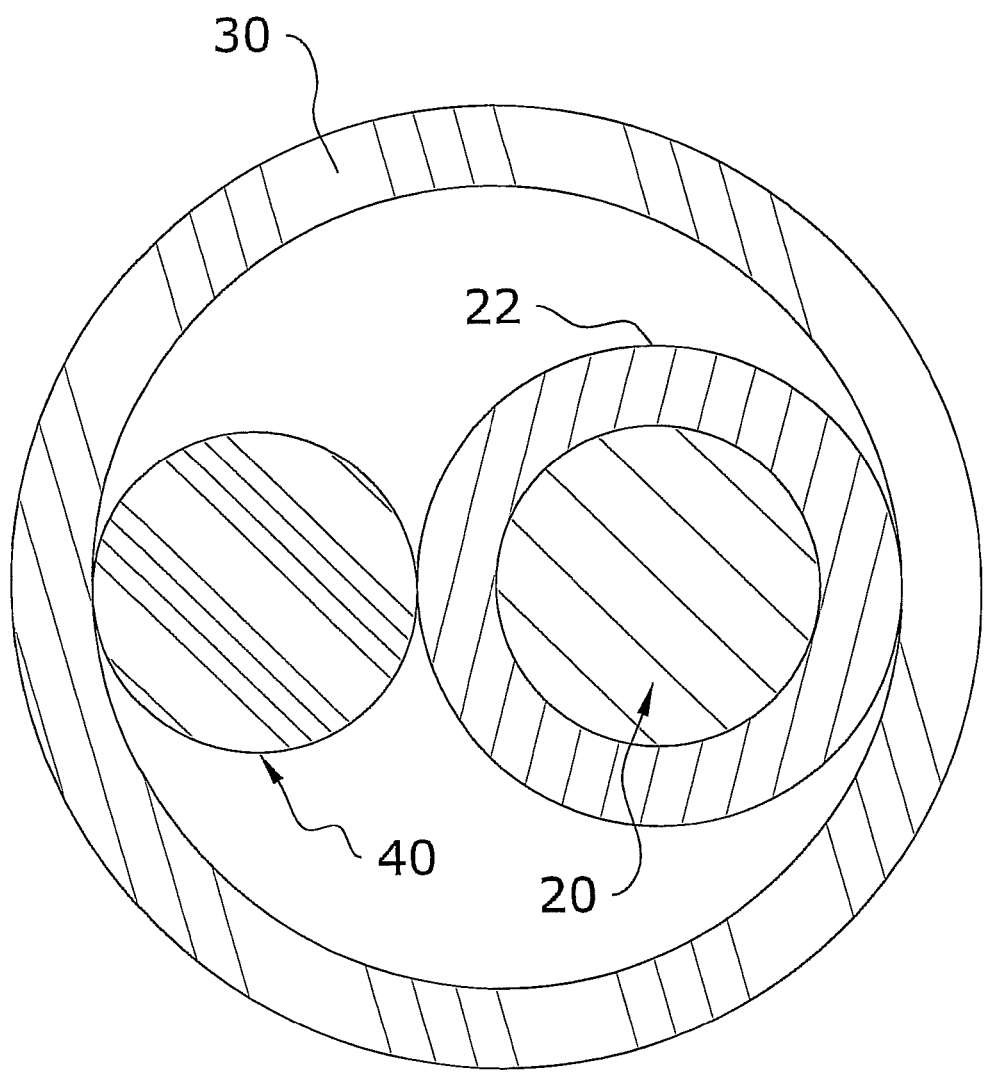
FIG. 3 is a cross sectional view illustrating the optical fiber surrounded by aramid fibers.

The luminescent member 40 along with the optical fiber 20 may be surrounded by a translucent cover 30 as shown in FIGS. 1 through 3. The translucent cover 30 protects both the optical fiber 20 and the luminescent member 40. The translucent cover 30 surrounds at least a substantial portion of the optical fiber 20 and the luminescent member 40 as illustrated in FIG. 1 of the drawings. The translucent cover 30 may be colored to produce a desired light color or substantially clear thereby allowing the natural light color of the luminescent member 40 to be emitted.

Figure 4:
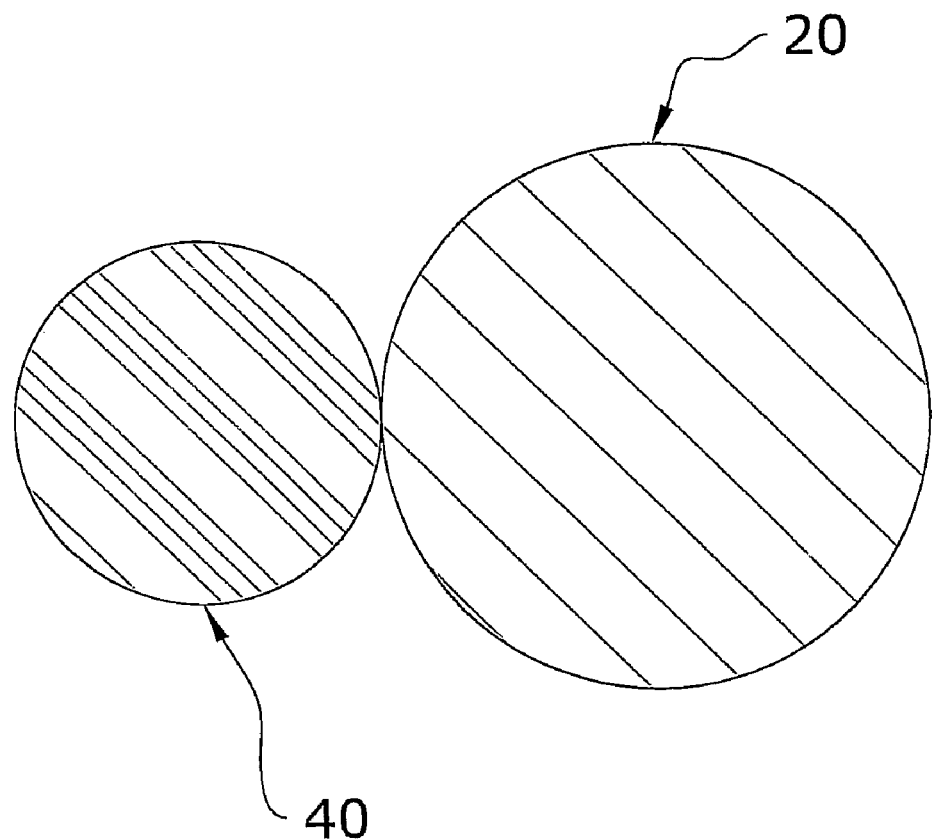
FIG. 4 is a cross sectional view of an alternative embodiment comprised of the luminescent member and the optical fiber attached to one another without a translucent cover.

Alternatively, the luminescent member 40 and the optical fiber 20 may be connected to one another without a translucent cover 30 as shown in FIG. 4 of the drawings. The luminescent member 40 and the optical fiber 20 may be connected by a junction that may be disconnected if desired.

Figure 5:
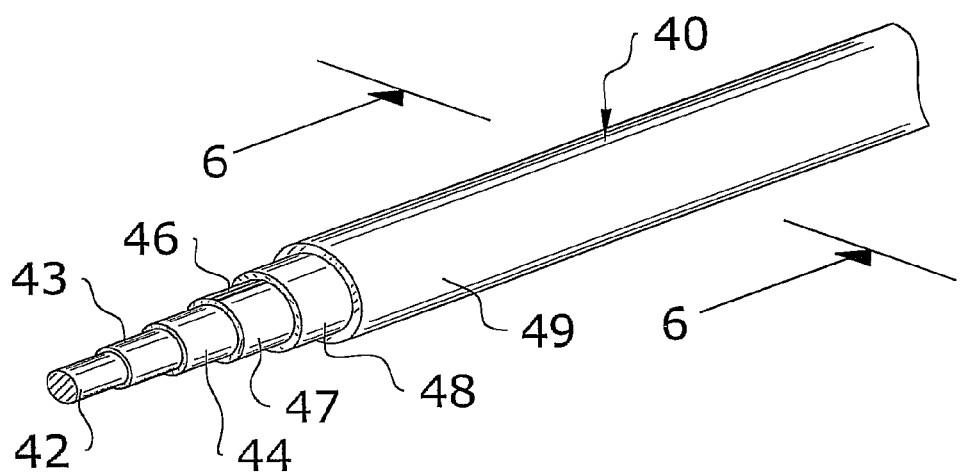
FIG. 5 is an upper perspective partial cutaway view of an exemplary luminescent member comprised of electroluminescent wire.
Figure 6:
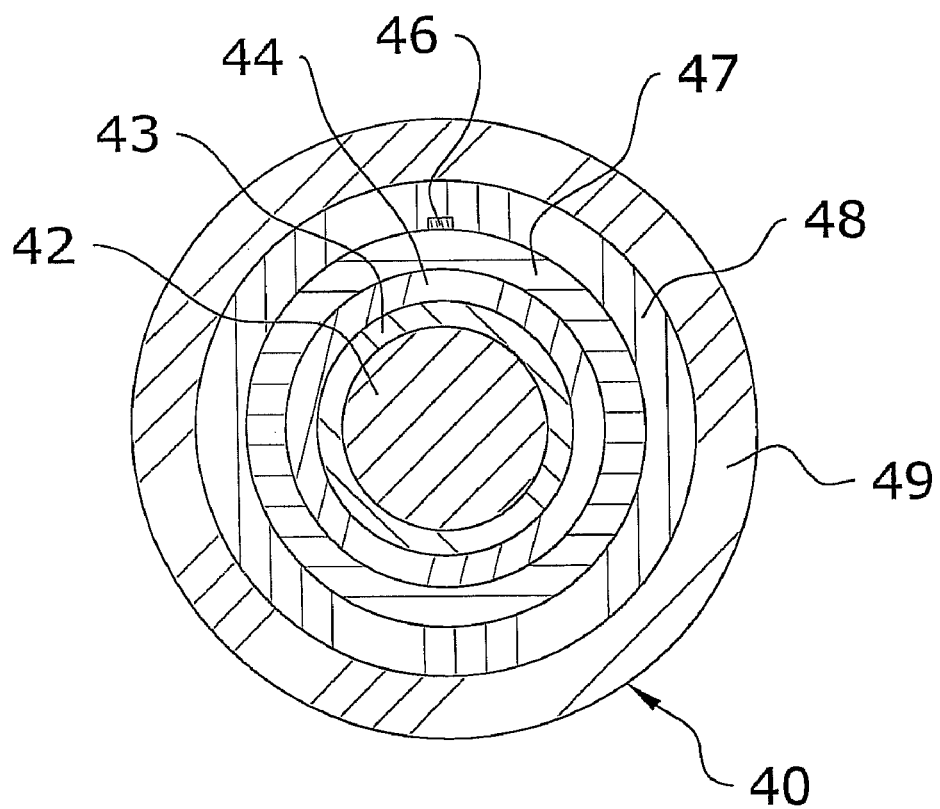
FIG. 6 is a cross section view taken along line 6-6 of FIG. 5 illustrating an exemplary electroluminescent wire.

The luminescent member 40 is preferably comprised of electroluminescent wire ("EL wire"). FIGS. 5 and 6 illustrate an exemplary electroluminescent wire structure suitable for usage within the present invention. It can be appreciated that various other types of electroluminescent wire structures may also be used. The electroluminescent wire is basically comprised of a thin inner wire 42 surrounded by a dielectric layer 43 and a phosphor layer 44 surrounding the dielectric layer 43. A conductive layer 47 surrounds the phosphor layer 44 and an outer wire 46 surrounds the conductive layer 47. The conductive layer 47 is electrically conductive and in electrical communication with the outer wire 46. A first cover 48 preferably surrounds the conductive layer 47 and the outer wire 46 as shown in FIG. 5. The first cover 48 is preferably comprised of a clear plastic sleeve. A second cover 49 may also be used surrounding the first cover 48 for added protection. The first cover 48 and/or the second cover 49 may be colored to change the color emitted by the electroluminescent wire.

One of the advantages of electroluminescent wire is that it illuminates along the entire length of the electroluminescent wire by applying a small AC voltage between the inner wire 42 and the outer wire 46. The AC voltage creates an oscillating electric field that activates the phosphor layer 44 thereby illuminating the luminescent member 40. When the electroluminescent wire is less than or equal to 1 mm in thickness, the luminescent member 40 has lightweight suitable for usage with the optical fiber 20 without providing an undue weight on the optical fiber 20.

D. Patch Panels.

Figure 7:
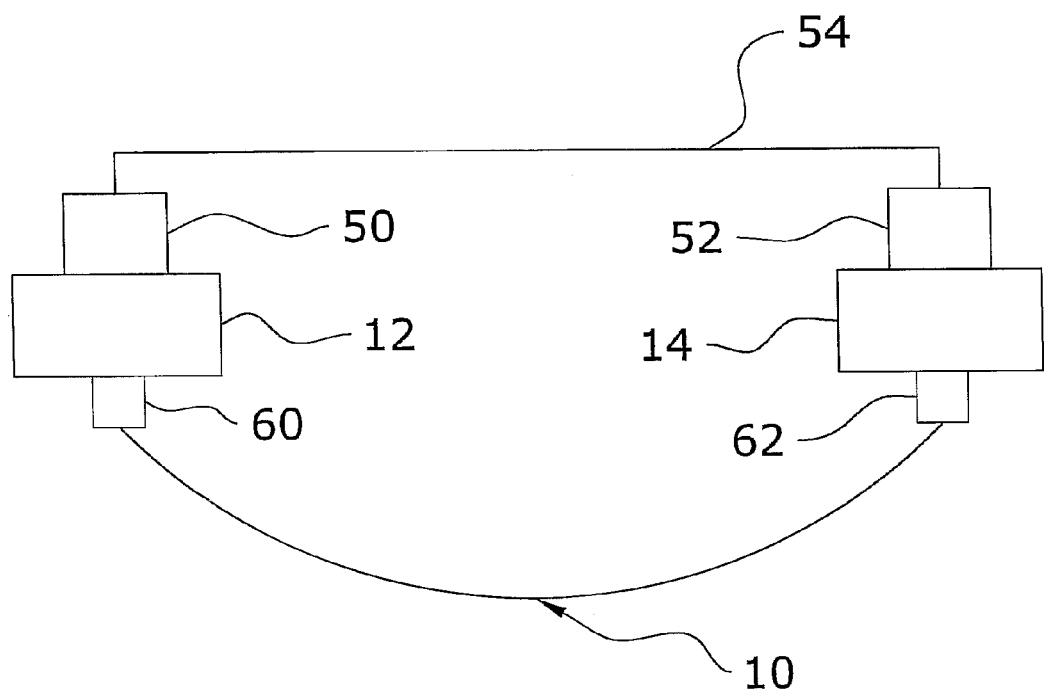
FIG. 7 is a block diagram illustrating an exemplary fiber-optic communication system with the present invention implemented.

FIG. 7 illustrates a first patch panel 12 and a second patch panel 14 within the fiber-optic communication system. The first end of the optical fiber 20 is in communication with the first patch panel 12 and the second end of the optical fiber 20 is in communication with the second patch panel 14 as is well known in the art. Optical fibers 20 extending between patch panels 12, 14 are often times referred to as patch cords. The optical fiber 20 transfers information via light pulses carried within the optical fiber 20 between the first patch panel 12 and the second patch panel 14. The patch panels 12, 14 determine where the information is transferred to which may include converting the light signal to an electrical signal.

E. Connectors.

The ends of the optical fiber 20 and the luminescent member 40 may be separate from one another and have their own respective connectors. However, it is preferably to have the optical fiber 20 and the luminescent member 40 connected at a first end to a first connector and at an opposite second end to a second connector for communicating with the first patch panel 12 and the second patch panel 14 respectively. Using a single connector allows for efficient connection of the present invention within a fiber optic communication system.

F. Controllers.

FIG. 7 further illustrates the usage of a first controller 50 in communication with a second controller 52 via a communication cable 54. The controllers 50, 52 may communicate with one another via other communication means (e.g. wireless). A first sensor 60 is in communication with the first controller 50 and a second sensor 62 is in communication with the second controller 52. The sensors 60, 62 detect light emitted by the luminescent member 40 and notify the corresponding controller 50, 52 so that the controller 50, 52 may communicate to the other controller 50, 52 that light and/or an electrical signal from the luminescent member 40 was detected indicating which two points on the patch panels 12, 14 are connected.

The first controller 50 is adjacent the first patch panel 12 and the second controller 52 is adjacent the second patch panel 14. The second controller 52 sends a notification signal to the first controller 50 when light and/or electrical signal is detected from a portion of the luminescent member 40 adjacent to the second end of the optical fiber 20. The first controller 50 is also capable of sending a notification signal to the first controller 50 when light and/or electrical signal is detected. The controllers 50, 52 provide a visual and/or audible indication to the user when light and/or electrical signal from the luminescent member 40 is detected by the other controller 50, 52 thereby providing feedback regarding which two locations on the patch panels 12, 14 are connected. The electrical signal detected from the luminescent member 40 is preferably the alternating current (AC) used to illuminate the luminescent member 40.

G. Operation of Preferred Embodiment.

In use, assuming the luminescent member 40 is comprised of an electroluminescent wire, an AC voltage is applied to the luminescent member 40 thereby resulting in the electroluminescent member 40 to illuminate along the entire length thereof in a continuous and 360 degree manner. The illumination of the luminescent member 40 allows for visual tracing by an individual along the entire path of the optical fiber 20. The AC voltage may be applied by any type of AC electrical power source.

The light emitted may be visually seen at both ends and between thereof to allow for visual location of the selected optical fiber 20. The user may visually inspect the path of the fiber optic communication system to identify the selected optical fiber 20 along the entire length thereof. In addition, the controllers 50, 52 are able to detect which two ports on the patch panels 12, 14 are connected.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An optical fiber tracing system, comprising:
   an optical fiber having a first end and a second end, wherein said optical fiber is for a fiber-optic communications;
   a luminescent member positioned adjacent to and along said optical fiber, wherein said luminescent member illuminates for allowing a selective visual tracing of an individual optical fiber or group of optical fibers; and
   a first patch panel and a second patch panel, wherein said first end of said optical fiber is in communication with said first patch panel and wherein said second end of said optical fiber is in communication with said second patch panel.

2. The optical fiber tracing system of claim 1, wherein a substantial portion of the length of said luminescent member illuminates.

3. The optical fiber tracing system of claim 1, wherein a substantial and continuous portion of the length of said luminescent member illuminates.

4. The optical fiber tracing system of claim 1, wherein said luminescent member extends from said first end to said second end of said optical fiber.

5. The optical fiber tracing system of claim 1, wherein said luminescent member extends along the length of said optical fiber.

6. The optical fiber tracing system of claim 1, including a translucent cover surrounding at least a substantial portion of said optical fiber and said luminescent member.

7. The optical fiber tracing system of claim 6, wherein said translucent cover is colored.

8. The optical fiber tracing system of claim 6, wherein said translucent cover is substantially clear.

9. The optical fiber tracing system of claim 6, including aramid fibers surrounding said optical fiber.

10. The optical fiber tracing system of claim 1, wherein said luminescent member is comprised of an electroluminescent wire.

11. The optical fiber tracing system of claim 1, including a first controller in communication with a second controller, wherein said first controller is adjacent said first patch panel and wherein said second controller is adjacent said second patch panel, and wherein said second controller sends a notification signal to said first controller when a signal is detected from said luminescent member.

12. The optical fiber tracing system of claim 11, including a sensor adjacent to said luminescent member for detecting said signal from said luminescent member, wherein said signal is comprised of an electrical signal.

13. The optical fiber tracing system of claim 1, wherein said optical fiber and said luminescent member are connected at one end to a first connector and at an opposite end to a second connector for communicating with a first patch panel and a second patch panel respectively.

14. The optical fiber tracing system of claim 1, wherein said luminescent member has a thickness less than or equal to 1 mm.

15. The optical fiber tracing system of claim 14, wherein said luminescent member is comprised of an electroluminescent wire.

16. An optical fiber tracing system, comprising:
   an optical fiber having a first end and a second end, wherein said optical fiber is for a fiber-optic communications;
   a luminescent member positioned adjacent to and along said optical fiber, wherein said luminescent member illuminates for allowing a selective visual tracing of an individual optical fiber or group of optical fibers;
   wherein said luminescent member has a thickness less than or equal to 1 mm;
   wherein said luminescent member is comprised of an electroluminescent wire;
   wherein a substantial and continuous portion of the length of said luminescent member illuminates;
   wherein said luminescent member extends the length of said optical fiber from said first end to said second end of said optical fiber; and
   a first patch panel and a second patch panel, wherein said first end of said optical fiber is in communication with said first patch panel and wherein said second end of said optical fiber is in communication with said second patch panel.

17. The optical fiber tracing system of claim 16, including a translucent cover surrounding at least a substantial portion of said optical fiber and said luminescent member, wherein said translucent cover is colored or substantially clear.

18. The optical fiber tracing system of claim 16, including a first controller in communication with a second controller, wherein said first controller is adjacent said first patch panel and wherein said second controller is adjacent said second patch panel, and wherein said second controller sends a notification signal to said first controller when a signal is detected from said luminescent member.

19. The optical fiber tracing system of claim 18, including a sensor adjacent to said luminescent member for detecting said signal from said luminescent member, wherein said signal is comprised of an electrical signal.

20. An optical fiber tracing system, comprising:
   an optical fiber having a first end and a second end, wherein said optical fiber is for a fiber-optic communications;
   a luminescent member positioned adjacent to and along said optical fiber, wherein said luminescent member illuminates for allowing a selective visual tracing of an individual optical fiber or group of optical fibers;
   wherein said luminescent member has a thickness less than or equal to 1 mm;
   wherein said luminescent member is comprised of an electroluminescent wire;
   wherein a substantial and continuous portion of the length of said luminescent member illuminates;

wherein said luminescent member extends the length of said optical fiber from said first end to said second end of said optical fiber;

a translucent cover surrounding at least a substantial portion of said optical fiber and said luminescent member, wherein said translucent cover is colored or substantially clear;

a first patch panel and a second patch panel, wherein said first end of said optical fiber is in communication with said first patch panel and wherein said second end of said optical fiber is in communication with said second patch panel;

a first controller in communication with a second controller, wherein said first controller is adjacent said first patch panel and wherein said second controller is adjacent said second patch panel, and wherein said second controller sends a notification signal to said first controller when an electrical signal is detected from said luminescent member, wherein said electrical signal is comprised of an alternating current that illuminates said luminescent member; and a sensor adjacent to said luminescent member for detecting said electrical signal from said luminescent member;

wherein said optical fiber and said luminescent member are connected at one end to a first connector and at an opposite end to a second connector for communicating with said first patch panel and said second patch panel respectively.

* * * * *